UNITED STATES PATENT OFFICE.

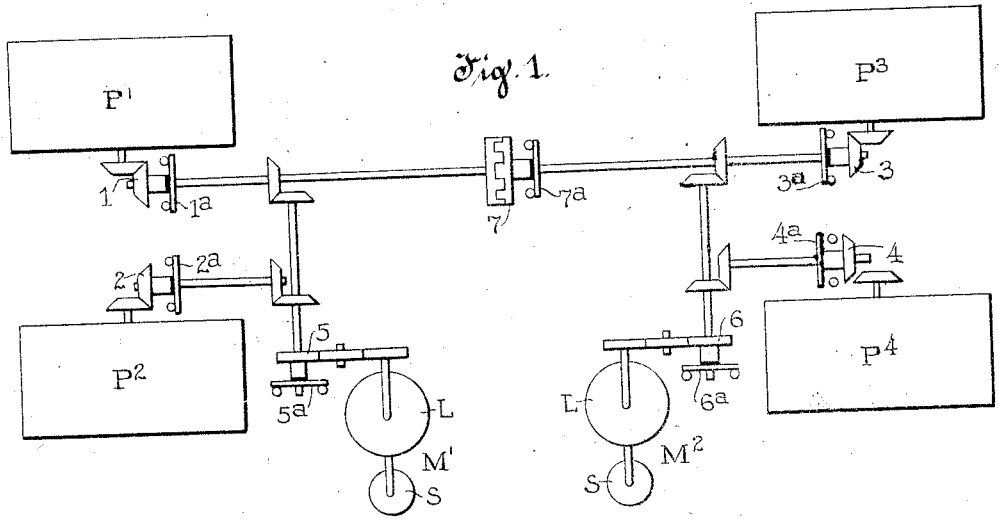
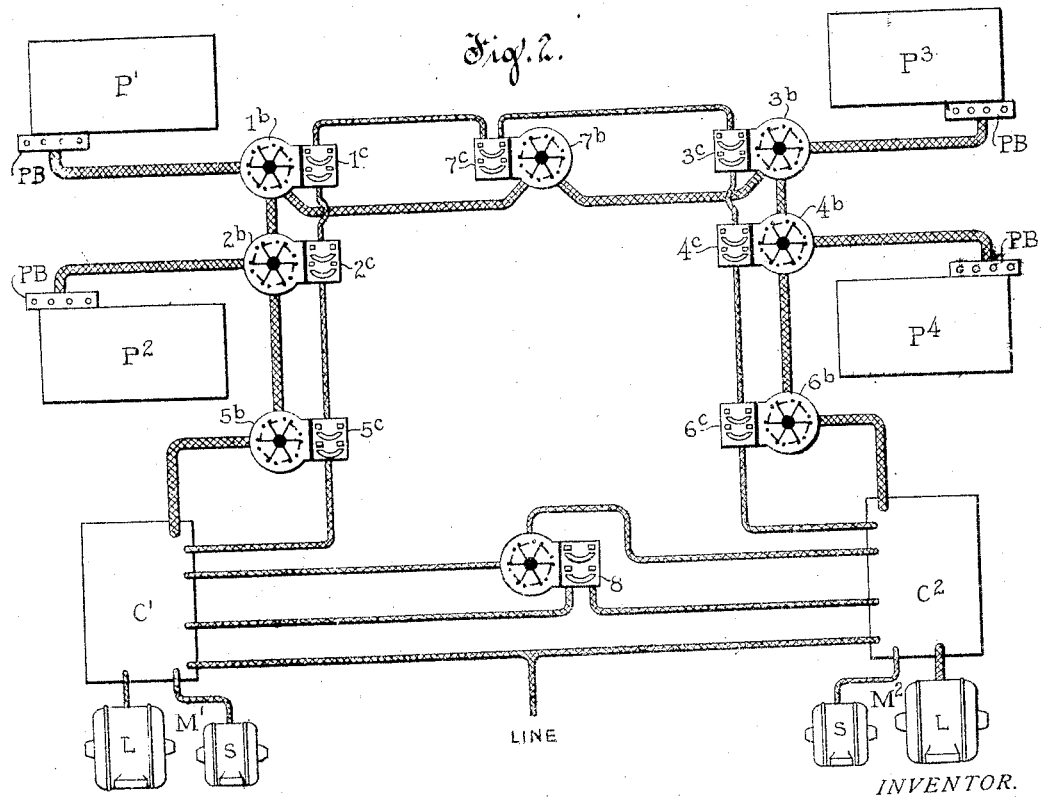

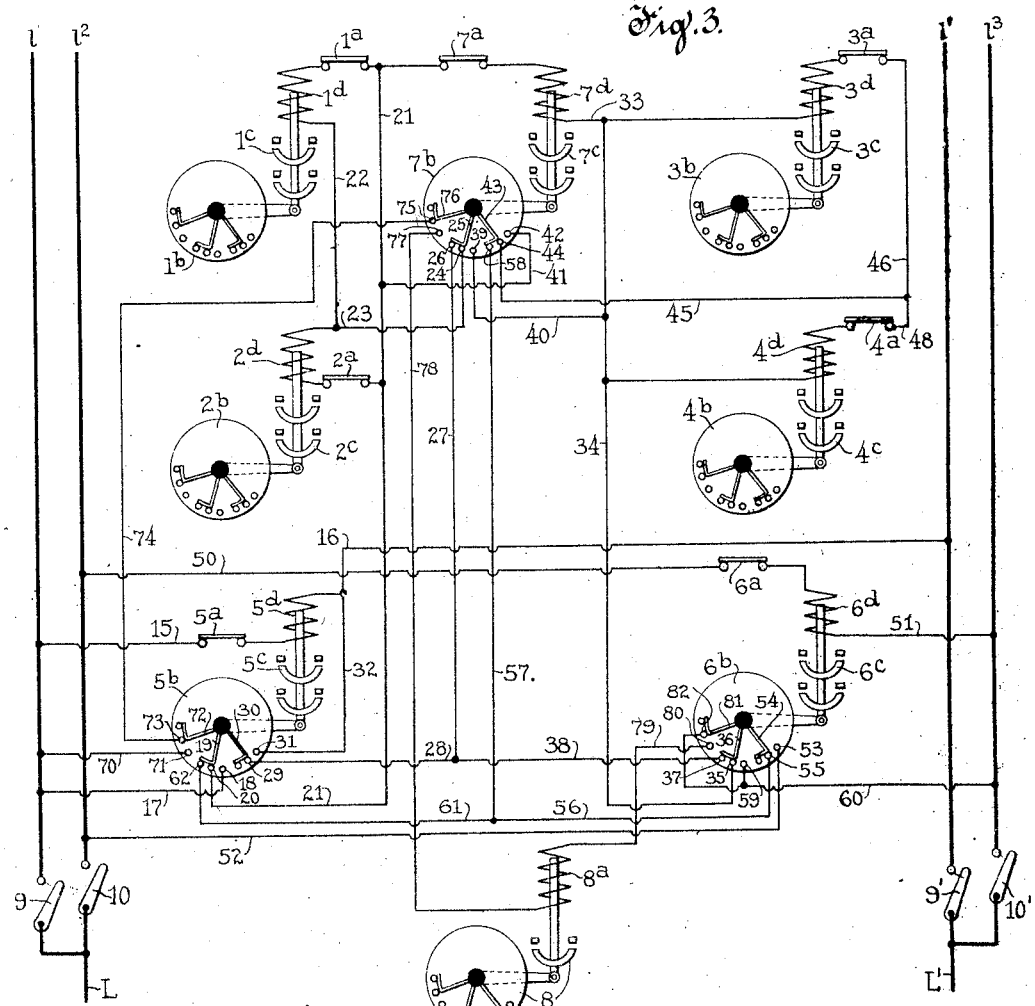

MAURICE M. GOLDENSTEIN, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROL SYSTEM.

1,255,874.  Specification of Letters Patent.  Patented Feb. 12, 1918.

Application filed February 26, 1917. Serial No. 150,847.

*To all whom it may concern:*

Be it known that I, MAURICE M. GOLDENSTEIN, a citizen of the United States, residing at Milwaukee, in the county of Milwaukee and State of Wisconsin, have invented new and useful Improvements in Motor-Control Systems, of which the following is a full, clear, concise, and exact description, reference being had to the accompanying drawing, forming a part of this specification.

This invention relates to multi-unit printing presses and similar mechanisms.

In my prior Patent No. 1,176,542, granted March 21, 1916, there is disclosed a control system for multi-unit printing presses and other mechanisms which is commutatable in various respects upon commutation of the mechanical driving connections between the driven and driving units and the present invention is particularly applicable to such systems, although not limited thereto.

In the aforesaid system of control electro-responsive switches are provided for effecting the various commutations, said switches being under the control of switches associated with the commutating devices of the mechanical driving connections and the present invention has among its objects to subordinate the electroresponsive commutating switches of such a system to the individual controllers for the driving units whereby the controller or controllers required for any driving combination must be line connected prior to response of the selected commutating switch or switches.

A further object of the invention is to provide for curtailment of the number of knife switches required for line connection in the aforesaid and other systems.

A still further object is to provide for the use of power operated line switches in the aforesaid and other systems instead of knife switches, if preferred, and to subordinate the commutating switches to such line switches for the purpose set forth.

Various other objects and advantages of the invention will hereinafter appear.

The accompanying drawings illustrate an embodiment of the invention and the same will now be described, it being understood that the invention may be embodied in various other forms falling within the scope of the appended claims.

In the drawing,

Figure 1 shows schematically a four-unit press, two driving units and driving connections;

Fig. 2 shows schematically the press and driving units and shows diagrammatically a commutatable control system therefor;

Fig. 3 shows diagrammatically the electroresponsive commutating switches and control circuits thereof; and, Fig. 4 shows diagrammatically a modification.

Referring to Fig. 1, the press shown therein comprises units $P'$, $P^2$, $P^3$ and $P^4$ adapted to be coupled through the driving connections illustrated to two driving units $M'$ and $M^2$, each including a large motor L and a small motor S. The driving connections include slip gears 1, 2, 3 and 4 by means of which the press units may be respectively disconnected from both driving units, slip gears 5 and 6, by means of which the driving units $M'$ and $M^2$ may be respectively disconnected from all press units and a clutch 7 by means of which the two driving units may be coupled and uncoupled. These slip gears, together with the clutch, thus provide for drive of the press units in various combinations by either or both of the driving units.

As will be understood, commutations of the driving connections require, or at least render desirable, corresponding commutations of the control system and for directing such control commutations the slip gears 1, 2, 3, 4, 5 and 6 and the clutch 7 are respectively provided with switches $1^a$, $2^a$, $3^a$, $4^a$, $5^a$, $6^a$ and $7^a$.

While the press illustrated is provided with only four units and with only two driving units, it is of course to be understood that the same might comprise the same number of driven and driving units as disclosed in said prior patent, or any other preferred number of each. It is also to be understood that the system of control disclosed in said patent is applicable to the reduced number of driven and driving units disclosed herein and it will be assumed that the system of control diagrammatically illustrated in Fig. 2 is identical with that disclosed in said patent, except for slight and obvious modifications required by the reduced number of units.

Referring to Fig. 2, the same shows diagrammatically a control panel C' for the two motor driving unit M', a control panel C² for the two motor driving unit M², a push button station PB for each press unit, commutating switches 1ᵇ to 7ᵇ and 1ᶜ to 7ᶜ and an additional commutating switch 8. The switches 1ᵇ to 7ᵇ and 1ᶜ to 7ᶜ are operable in pairs, as for example, 1ᵇ—1ᶜ and 2ᵇ—2ᶜ, by electro-responsive windings (Fig. 3) and are controllable by the aforesaid driving connections. The switch 8 in turn is controllable by certain of the aforesaid commutating switches as will be hereinafter set forth, and it may be assumed that switches 1ᵇ—1ᶜ to 7ᵇ—7ᶜ serve to commutate the connections between the push button stations and control panels and braking connections, while switch 8 serves to commutate overload connections and equalizing connections, as fully disclosed in said patent.

Referring now to Fig. 3, which discloses certain features of the present invention, it is assumed that the control panel C' is provided with a double pole knife switch 9—9' to connect the same to lines L and L' and that the control panel C² is provided with a double pole knife switch 10—10' to connect the same to said supply lines. It is further assumed that all commutating switches are dependent for energization upon branch circuits l—l' and l²—l³ which are respectively controlled by said knife switches, and briefly set forth the circuit arrangement is such that response of the commutating switches is rendered dependent upon selective closure of the knife switches, or closure of both, according to the commutation to be effected. For example, if the commutation to be effected requires use of the control panel C', knife switch 9—9' must be closed to effect energization of the desired commutating switches, whereas if the commutation to be effected requires the use of the control panel C² the knife switch 10—10' must be closed to effect energization of the desired commutating switches. Further, if the commutation to be effected requires use of both control panels, both knife switches must be closed for energization of the desired commutating switches. Also, the circuit arrangement is such that certain of the commutating switches are dependent for their energization upon prior response of other commutating switches, as hereinafter set forth.

Further, describing Fig. 3, the same shows the switches 1ᵇ—1ᶜ to 7ᵇ—7ᶜ as of the spider type and as provided with operating windings 1ᵈ to 7ᵈ and shows the switches 1ᵃ to 7ᵃ as included in circuit with said windings 1ᵈ to 7ᵈ respectively. Also, it shows the switch 8 as provided with an operating winding 8ᵃ controllable jointly by the commutating switches 5ᵇ, 6ᵇ and 7ᵇ and shows the latter switches as each provided with certain contacts in addition to those required for control of the switch 8 and for the commutations disclosed in said prior patent.

The circuit connections are as follows: Assuming commutation of the driving connections requiring use of the driving unit M' and its control panel C' and hence assuming closure of the switch 5ᵃ associated with slip gear 5, circuit is completed through the operating winding 5ᵈ if the knife switch of said control panel be closed. This circuit may be traced from line L through blade 9 of said knife switch to branch line l, by conductor 15 through switch 5ᵃ and winding 5ᵈ, by conductor 16 to branch line l' and thence through knife switch blade 9' to line L'. This provides for response of switches 1ᵇ—5ᶜ and said switch 5ᵇ in responding provides for energization of any or all of the windings 1ᵈ, 2ᵈ, 7ᵈ. For example, with the switch 1ᵃ closed, circuit is traceable from branch line l by conductor 17 through contacts 18, 19 and 20 of switch 5ᵇ, by conductor 21 through switch 1ᵃ and winding 1ᵈ, by conductors 22 and 23 through contacts 24, 25 and 26 of switch 7ᵇ, assuming normal positioning thereof, by conductors 27 and 28 through contacts 29, 30 and 31 of switch 5ᵇ, by conductor 32 to conductor 16 and thence to branch line l'. With switch 2ᵃ closed a parallel circuit is traceable through the winding 2ᵈ, said winding being connected to conductor 23 and connectible through switch 2ᵃ to conductor 21. With switch 7ᵃ closed, a circuit is traceable from conductor 21 through the winding 7ᵈ, by conductors 33 and 34 through contacts 35, 36 and 37 of switch 6ᵇ, by conductor 38 to conductor 28 and thence through switch 5ᵇ to branch line l' as already traced. Response of switch 7ᵇ interrupts the circuit of windings 1ᵈ and 2ᵈ, as previously traced, but reëstablishes said circuit from conductor 23 through contacts 24, 25 and 39, by conductor 40 to conductor 34 and thence through switches 6ᵇ, 5ᵇ to branch line l' as already traced. Also, response of switch 7ᵇ provides for energization of either or both windings 3ᵈ, 4ᵈ. For example, with switch 3ᵃ closed, a circuit is then traceable from branch line l through switch 5ᵇ to conductor 21 as already traced, by conductor 41 through contacts 42, 43 and 44 of switch 7ᵇ, by conductors 45 and 46 through switch 3ᵃ and winding 3ᵈ to conductor 34 and while with switch 4ᵃ closed a circuit is then traceable from conductor 45 by conductor 48 through switch 4ᵃ and winding 4ᵈ to conductor 34, said conductor being connected through switches 6ᵇ and 5ᵇ to branch line l' as already traced. Thus, summarizing the circuits, the same require closure of the knife switch 9—9′ prior to energization of the commutating switches $5^b$—$5^c$, response of the latter prior to energization of any of the remaining commutating switches (except $6^b$ and $6^c$) and response of the switch $7^b$ prior to response of either the switch $3^b$—$3^c$ or $4^b$—$4^c$.

Again assuming commutation of the driving connections requiring use of the driving unit $M^2$ and its control panel $C^2$, and hence assuming closure of the switch $6^a$ associated with the slip gear 6, circuit is completed through the operating winding $6^d$ if the knife switch of said control panel be closed. This circuit may be traced from line L through blade 10 of said knife switch, to branch line $l^2$, by conductor 50 through switch $6^a$ and winding $6^d$, by conductor 51 to branch line $l^3$ through the blade 10′ of the knife switch to line L′. This provides for response of switches $6^b$—$6^c$ and switch $6^b$ in responding provides for energization of any or all of the windings $3^d$, $4^d$ and $7^d$. For example, with the switch $3^a$ closed circuit is traceable from branch line $l^2$, by conductors 52 through contacts 53, 54 and 55 of switch $6^b$, by conductors 56 and 57 through contacts 58, 43 and 44 of switch $7^b$, by conductors 45 and 46 through switch $3^a$ and winding $3^d$, by conductors 33 and 34 through contacts 35 and 36 and 59 of switch $6^b$, by conductor 60 to branch line $l^3$. With switch $4^a$ closed a parallel circuit is traceable from conductor 45 to conductor 48 through switch $4^a$ and winding $4^d$ to conductor 34. With switch $7^a$ closed a circuit is traceable from branch line $l^2$ by conductor 52 to contacts 53, 54 and 55 of switch $6^b$, by conductors 56 and 61 through contacts 62, 19 and 20 of switch $5^b$, by conductor 21 through switch $7^a$ and winding $7^d$, by conductors 33 and 34 through switch $6^b$ as already traced to branch line $l^3$. Response of switch $7^b$ interrupts the circuits of the windings $3^d$ and $4^d$ as previously traced, but reëstablishes said circuit from conductor 21 by conductor 41 through contacts 42, 43 and 44 to conductor 45. Also, response of switch $7^b$ now provides for energization of either or both windings $1^d$—$2^d$. For example, with switch $1^a$ closed, a circuit is traceable from conductor 21 through switch $1^a$ and winding $1^d$ to conductor 22, by conductor 23 through contacts 24, 25 and 39 of switch $7^b$, by conductor 40 to conductor 34 and thence through switch $6^b$ as already traced to branch line $l^3$. With switch $2^a$ closed, a parallel circuit is established from conductor 21 through said switch and winding $2^d$ to conductor 22. Thus summarizing these circuits, the same require closure of knife switch 10—10′ prior to energization of the commutating switches $6^b$—$6^c$, response of the latter prior to energization of any of the remaining commutating switches (except $5^b$—$5^c$) and response of the switch $7^b$ prior to response of either the switch $1^b$—$1^c$ or $2^b$—$2^c$.

Again assuming commutation of the driving connections requiring the use of both driving units M′ and $M^2$ but for independent operation of one or two press units by each, i. e., with the clutch 7 disengaged, the circuit connections are traceable as above described. Finally assuming commutation of the driving connection requiring the use of both driving units for joint operation of one or more press units, i. e., with the clutch 7 engaged, energization of the windings of the commutating switches is rendered dependent upon closure of the knife switches of both control panels. The windings $5^d$ and $6^d$ are energizable by connection across branch lines $l$—$l'$ and $l^2$—$l^3$ respectively as previously traced, but the windings of the remaining switches are rendered dependent for energization upon connection across branch lines $l$—$l^3$ or $l^2$—$l'$. For example, with both knife switches closed and with the windings $5^d$ and $6^d$ energized, energization of winding $7^d$ is rendered dependent upon the following or similar connections: from branch line $l$ by conductor 17 through contacts 18, 19 and 20 of switch $5^b$, by conductor 21 through switch $7^a$ and said winding $7^d$, by conductors 33 and 34 through contacts 35, 36 and 59 of switch $6^b$, by conductor 60 to branch line $l^3$. Likewise, tracing the circuits of windings $1^d$ and $2^d$ from conductor 21 through said windings to conductor 23, the return circuit must pass through contacts 24, 25 and 39 of switch $7^b$ to conductor 34 and thence through switch $6^b$ to line $l^3$. On the other hand, tracing the circuits of windings $3^d$ and $4^d$ from branch line $l$ to conductor 21 and thence by conductor 41 to contacts 42, 43 and 44 by conductor 45 through said windings to conductor 34, the return must extend through switch $6^b$ to line $l^3$. Finally considering the winding $8^a$ of commutating switch 8, energization thereof is also dependent upon connection across branch lines $l$ and $l^3$. The circuit of this winding is traceable from branch line $l$ by conductor 70 through contacts 71, 72 and 73 of switch $5^b$, by conductor 74 through contacts 75, 76 and 77 of switch $7^b$, by conductor 78 through said winding, by conductor 79 through contacts 80, 81 and 82 of switch $6^b$ to conductor 60 and thence to branch line $l^3$.

Referring now to Fig. 4, it is assumed that the control panels C′ and $C^2$ are respectively provided with double pole electromagnetically operated switches 85 and 86 in lieu of the knife switches shown in Fig. 3. It is further assumed that the switches $5^a$ and $6^a$ of Fig. 3 are provided with auxiliary contacts to respectively control the operating windings of switches 85 and 86 current being supplied to both windings from lines L, L' through a knife switch 87 and with these exceptions it is assumed that the control of the commutating switches is the same as in Fig. 3.

More specifically referring to Fig. 4, the circuit connections are as follows: With the knife switch 87 closed, and with the switch $5^a$ closed, a circuit is traceable from line L through the left hand side of said knife switch, by conductor 88 through the auxiliary contacts of switch $5^a$, by conductor 89 through the winding of switch 85, by conductor 90 through the right hand side of said knife switch to line L'. This provides for closure of switch 85 to connect the controller C' to the line and to close the branch circuit $l$—$l'$ for the commutating switches. On the other hand, with the knife switch closed and with the switch $6^a$ closed, circuit is traceable from line L through the left hand side of the knife switch, by conductor 91 to the auxiliary contacts of switch $6^a$, by conductor 92 through the winding of switch 86 to conductor 90 and thence to the right hand side of the knife switch to line L'. This provides for energization of the switch 86 to connect the controller $C^2$ to the line and to complete the branch circuit $l^2$—$l^3$ for the commutating switches. As will be understood, simultaneous closure of both switches $5^a$ and $6^a$ will effect response of both switches 85 and 86 and as will further be understood, the single knife switch control scheme illustrated is applicable to systems including a greater number of control panels.

What I claim as new and desire to secure by Letters Patent is:

1. In a commutatable control system for a plurality of motors, in combination, a plurality of controllers for the motors, commutating means providing for independent and joint use of the motors and means for effecting operation of said commutating means but subject to a given condition of one or a plurality of said controllers according to the commutation to be effected.

2. In a commutatable control system for a plurality of motors, in combination, a plurality of controllers for the motors, commutating means providing for use of said motors jointly or selectively and means for effecting operation of said commutating means but subject to control by said controllers jointly or selectively according to the commutation to be effected thereby.

3. In a commutatable control system for a plurality of motors, in combination, a plurality of controllers for the motors, a plurality of commutating devices providing for independent or joint use of said motors and means for operating said commutating devices but subject to control by said controllers singly or jointly according to the commutation to be effected, and further subject to control of certain of said devices by other of the same.

4. In a commutatable control system for a plurality of motors, in combination, a plurality of controllers for the motors, each having a line switch, electro-responsive commutating means providing independent and joint use of the motors and connections rendering response of said electro-responsive means dependent upon closure of the line switch of one or each of a plurality of said controllers according to the commutation to be effected.

5. In a commutatable control system for a plurality of motors, in combination, a plurality of controllers for the motors, each having a line switch, electro-responsive commutating means providing for selective or joint use of said controllers and the motors controlled thereby and circuit connections rendering response of said electro-responsive means dependent upon the closure of the line switches of said controllers collectively or selectively according to the commutation to be effected.

6. In a commutatable control system for a plurality of motors, in combination, a plurality of controllers for the motors, each having a line switch, a plurality of electro-responsive commutating switches providing for independent and joint use of said controllers and their respective motors, and connections rendering certain of said switches dependent upon closure of the line switch of one or each of a plurality of said controllers according to the commutation to be effected and further rendering response thereof essential to response of other of said switches.

7. In a commutatable control system for a plurality of motors, in combination, separate controllers for the motors, each having a line switch, a plurality of electro-responsive commutating switches providing for joint or independent use of said controllers and their respective motors, certain of said switches being each dependent for energization upon the closure of the line switch of a corresponding one of said controllers to insure line connection of one or a plurality of said controllers according to the commutation to be effected.

8. In a commutatable control system for a plurality of motors, in combination, separate controllers for the motors, each having a line switch, a plurality of electro-responsive commutating switches providing for joint or independent use of said controllers and their respective motors, certain of said switches being each dependent for energization upon the closure of the knife switch of a corresponding one of said controllers to insure line connection of one or a plurality of said controllers according to the commutation to be effected, and other of said switches being dependent for energization upon line connection of a plurality of said controllers when the commutation to be effected requires the use of such plurality of controllers.

9. In a commutatable control system for a plurality of motors, in combination, a plurality of controllers for the motors, each having an electro-responsive line switch, electro-responsive commutating means to provide for joint or independent use of the motors, common means for directing operation of said line switches and said commutating means and connections rendering response of the latter dependent upon prior response of certain of the former.

10. In a commutatable control system for a plurality of motors, in combination, a plurality of controllers for the motors, each having an electro-responsive line switch, electro-responsive commutating means to provide for joint or independent use of the motors, common means for directing operation of said line switches and said commutating means and connections rendering response of the latter dependent upon prior response of the former selectively or collectively according to the commutation to be effected.

11. In combination, a motor controller having a line switch, a plurality of control stations, commutating means to subject said controller to the influence of said stations individually or collectively and power means for operating said commutating means but only upon closure of said line switch.

12. In combination, a plurality of motor controllers, each having a line switch, a control station, commutating means for subjecting one or a plurality of said controllers to the influence of said control station and power means for operating said commutating means but only upon closure of the line switch of one or each of a plurality of said controllers according to the commutation to be effected.

13. In combination, a plurality of motor controllers, each having a line switch, a control station, electro-responsive commutating means to connect said controllers selectively or collectively to said control station and connections rendering response of said means dependent upon selective or collective closure of said line switches according to the commutation to be effected.

14. In combination, a plurality of motor controllers, each having an electro-responsive line switch, electro-responsive means to connect said controllers individually and collectively to said control station and common means to direct operation of said line switches and said commutating means, response of the latter being dependent upon prior response of the former.

15. In combination, a plurality of driven units, a separate motor-driving unit for each of said driven units, driving connections providing for release of each of said driving units from its respective driven unit and further providing for coupling and uncoupling of a plurality of said driven units a controller for each of said driving units including a line switch and a plurality of electro-responsive switches to effect control commutations according to the commutations of said driving connections, each of a plurality of said commutating switches being dependent for energization upon closure of the line switch of a corresponding controller and other of said commutating switches being dependent upon response of the former individually or collectively according to the commutation to be effected.

16. In combination, a plurality of driven units, a motor driving unit for each of said driven units, driving connections providing for release of each of said driving units from its respective driven unit and further providing for coupling and uncoupling of a plurality of said driven units, a controller for each of said driving units including an electro-responsive line switch, a plurality of electro-responsive switches to effect control commutations and means for directing operation of said line switches and commutating switches in accordance with the commutations of said driving connections, each of a plurality of said commutating switches being dependent for energization upon closure of the line switch of a corresponding controller and other of said commutating switches being dependent for energization upon response of the former individually or collectively according to the commutation to be effected.

In witness whereof, I have hereunto subscribed my name.

MAURICE M. GOLDENSTEIN.